Aug. 14, 1951　　　H. B. BABSON ET AL　　　2,564,047
MILKING PARLOR STALL
Filed Feb. 10, 1948　　　　　　　　　　　　　3 Sheets-Sheet 1
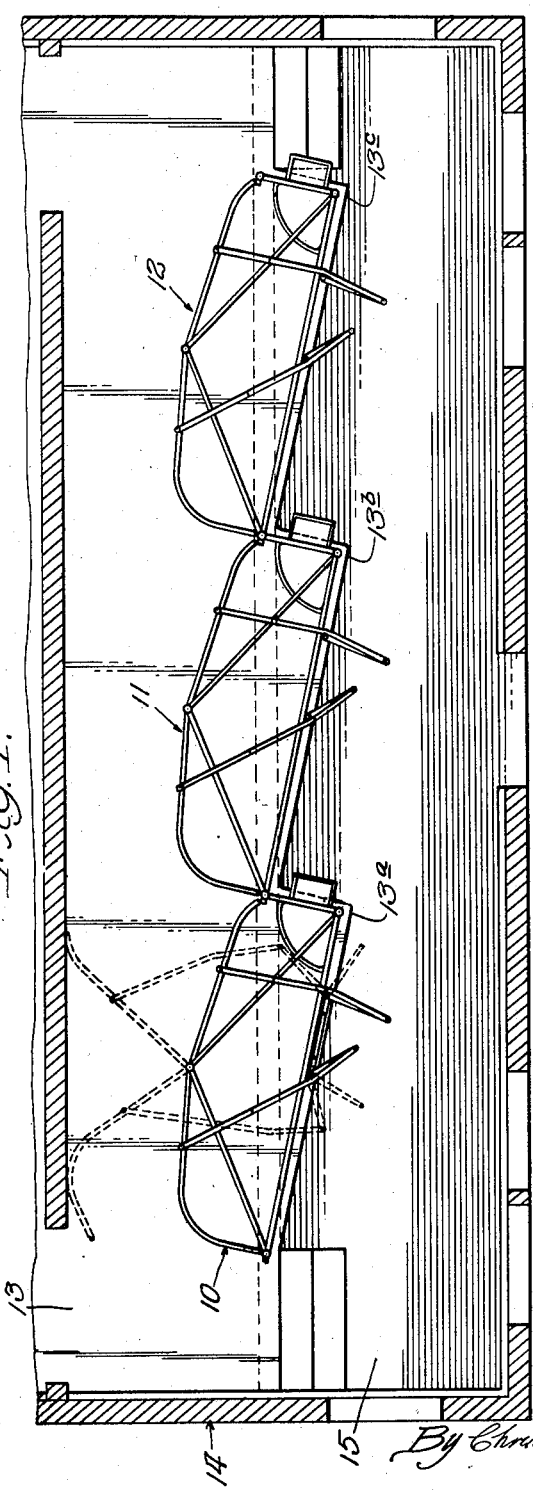
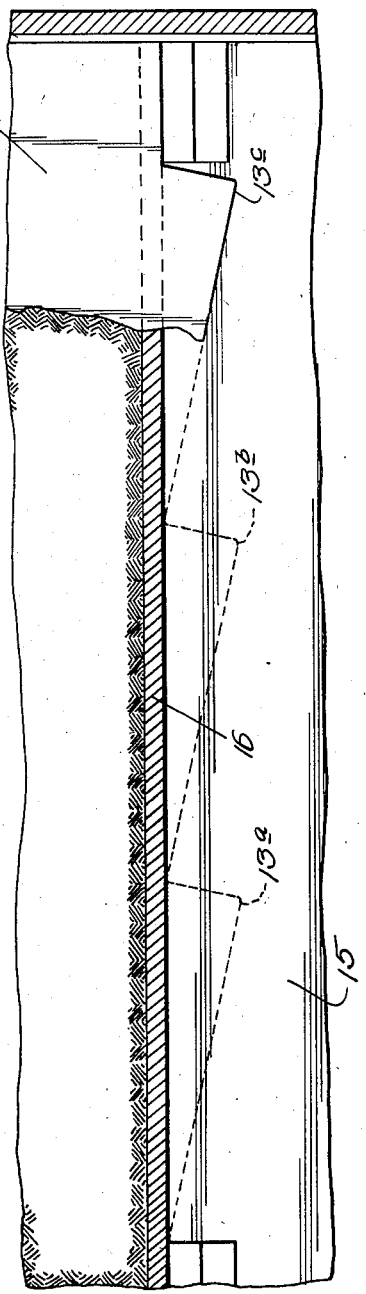
Inventors:
Henry B. Babson,
Chester A. Thomas,
By Chritton, Schroeder, Merriam & Hofgren,
Attys.

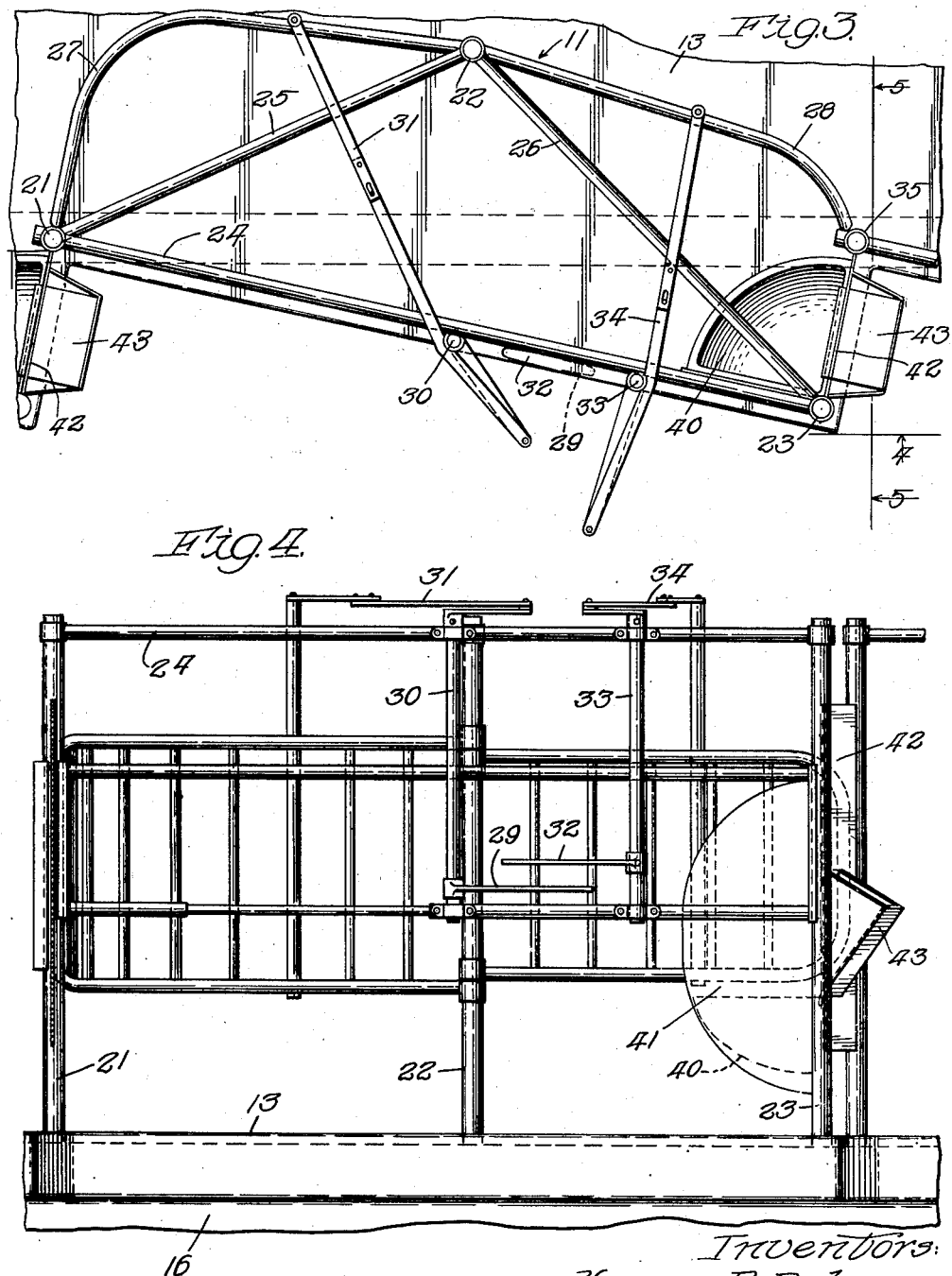

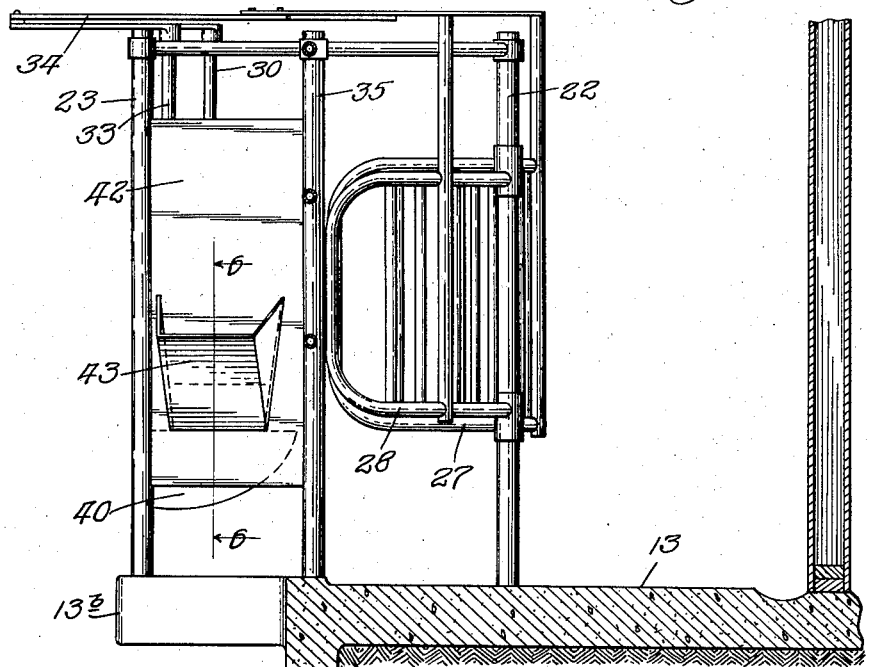
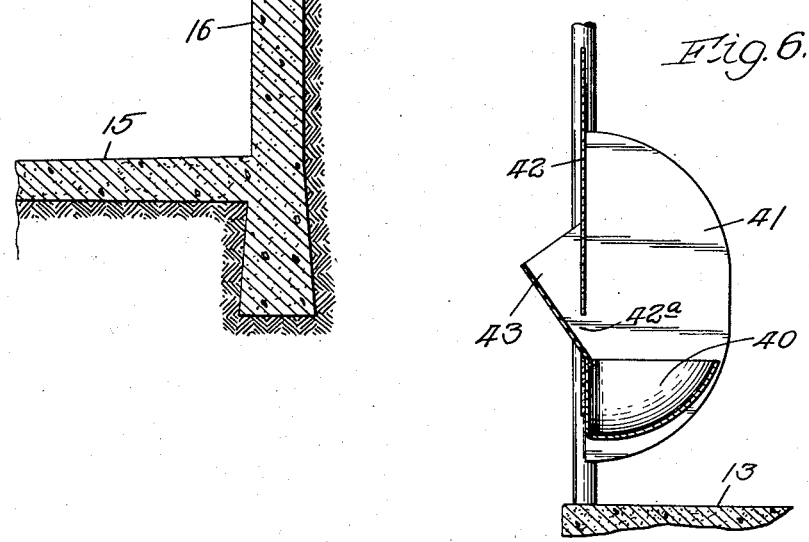

Patented Aug. 14, 1951

2,564,047

UNITED STATES PATENT OFFICE 2,564,047

MILKING PARLOR STALL

Henry B. Babson, Chicago, and Chester A. Thomas, Lake Forest, Ill., assignors to Babson Bros. Co., a corporation of Illinois Original application February 25, 1946, Serial No. 649,924. Divided and this application February 10, 1948, Serial No. 7,434

5 Claims. (Cl. 119—27)

This invention relates to a milking parlor, and more particularly to an improved parlor stall construction.

The present application is primarily concerned with improvements in a stall particularly for milking parlors, as of the general type shown in Babson and Stampen Reissue Patent 22,657 of August 7, 1945. This application is a division of our application Serial No. 649,924, filed February 25, 1946, now Patent 2,477,035, issued July 26, 1949.

We have found it highly desirable to arrange a plurality of parlor stalls in a milking parlor in zigzag or stepped relationship, as disclosed and claimed in the above-mentioned reissue patent; and to have the cow floor (the floor on which the cows walk and on which the stalls are placed) at a higher level than the operator's floor or alley. If there is something in the neighborhood of a couple of feet difference in the floor levels the operator can place milking machines in operation and remove them from under the cow at a level which is much more convenient and which greatly reduces the effort otherwise necessary if the operator must stoop to a low level to put the machine into and remove it from milking position.

The particular arrangement illustrated, making use of a regularly formed wall, as contrasted with a zigzag wall having right angle corners therein, rising from the floor of the operator's alley along a line back from the projecting ends of the stalls, and having the floor supporting the stalls with at least a portion of its irregular margin projecting out over this wall, is the subject of claims in the parent application 649,924.

Another feature which is the subject of claims in the parent application is the provision of an improved feeding trough and chute arrangement at the end of each parlor stall, facilitating feeding a grain supplement, for example, to the cows during milking.

The feature to which this divisional application is directed is the provision of an improved stall construction which provides the maximum rigidity and strength with the minimum of uprights and bracing members, by making the basic framework of the stall triangular. That is, instead of making the basic stall structure rectangular, we have found that it can be greatly simplified and strengthened by using a triangular main structure, although the general construction and arrangement is such that the space into which the cow is brought is generally rectangular in shape.

Other features and advantages of this invention will be apparent from the following specification and the drawings, in which:

Figure 1 is a plan view of one form of milking parlor embodying our inventions; Figure 2 is a horizontal fragmentary sectional view, partly broken away, and with the stalls removed, to show the relationship between the supporting wall and the floor of the operator's alley; Figure 3 is an enlarged plan view principally consisting of a single stall; Figure 4 is a side elevational view of the apparatus shown in Figure 3; Figure 5 is a transverse vertical sectional view along the line 5—5 of Figure 3; and Figure 6 is an enlarged fragmentary vertical sectional view of the feeding trough and chute, along the line 6—6 of Figure 5.

In the particular embodiment of the invention illustrated herewith three parlor stalls designated in general as 10, 11 and 12 are shown as arranged in zigzag or stepped relationship (in accordance with the teachings of the above-mentioned Reissue Patent 22,657, to which reference may be made to supplement the present disclosure if desired) on the cow floor 13, the higher level floor of the two floors in the milking parlor barn here indicated in general as 14. The other side of the milking parlor barn is here indicated as provided with a floor 15 at a lower level, this providing the operator's working floor or operator's alley, as it is sometimes termed, suitable sets of steps being provided for communication between the two floors which are preferably about two feet different in level, as may be best seen in Figure 5.

The cow floor is provided with an irregular margin comprising the triangular portions 13a, 13b and 13c, these triangular portions each having one long side and one short side and in general having an area of the same order as that of half the area required for each stall. Between the cow floor 13 and the operator floor 15 is a supporting wall 16, this wall being regularly formed; i. e., with no sharp angles or changes of directions, the particular wall shown here being straight. As may be best understood from Figures 2 and 5, the saw tooth shaped margin of the upper floor consisting of the triangular portions 13a, 13b and 13c projects out from this wall 16, so that at the level of the cow floor the margin is irregular. Nevertheless, since the wall 16 is regularly formed the junction line between the wall 16 and the floor 15 of the operator's level is regular and without any sharp irregularities, so that it may be readily completely cleaned as by flushing with a hose or sweeping with a broom, Referring now more particular to Figures 3 and 4, and describing the stall 11 as representative, it will be seen that each stall comprises a triangular section as its basic or main framework. In the stall 11, for example, this triangular frame comprises the vertical members or posts 21, 22 and 23, with their lower ends set in the concrete of the cow floor 13, and with their upper ends held in the desired relationship by bracing members 24, 25 and 26, generally of pipe, located at a height above the normal height of a cow. The posts 21 and 23 are on the side of the stall toward the operator's alley, while the post 22 is on the opposite side of the stall, as may be best seen in Figure 3; and this latter post serves as the pivotal mounting means for entrance and exit gates here identified in general as 27 and 28. Manual operating means including the handle 29, riser member 30 and interconnecting linkage 31 serves to enable the gate 27 to be moved between opened and closed position and locked in closed position; and handle 32, riser member 33 and connecting linkage 34 serve similarly for the exit gate 28. The general construction and operation of such gates and their action may be further gone into if desired by reference to the above-mentioned Reissue Patent 22,657, or the copending Thomas application Serial No. 522,883, filed February 18, 1944, which issued as Patent No. 2,528,255 on October 31, 1950. The exit gate 28 cooperates with the vertical post 35 of the next stall in the line of parlor stalls, corresponding to the post 21 of the stall just described.

While the use of entrance and exit gates, and even some curvature at the ends of such gates is not now first being disclosed, the stall structure with which they are associated has heretofore been much more complicated, involved a greater number of posts and not as strong. Some lengthening of the gates and their arrangement and relationship as illustrated has enabled the basic structure of the stall to be triangular, as heretofore described, and this has resulted not only in a simpler construction but in one which is much sturdier and more satisfactory than any heretofore in use.

Referring now more particularly to Figures 4, 5 and 6, it will be seen that each stall is provided in the end thereof with a feeding trough, as the trough 40, this preferably being behind a shield member 41 adapted to minimize the amount of feed which the cow may accidentally knock over into the operator's alley. In order to prevent any feed from being forced up over the end of the trough 40 and out through the end of the stall, an end plate 42 is provided for a similar shielding purpose. Heretofore proper shielding of the feed trough has rendered its frequent filling rather difficult, and we have obviated this difficulty by providing a chute 43 in the end of each stall communicating through the opening 42a with the interior of the trough 40. By locating this chute in the end of the stall it is out of the way, not interfering with operation of the handles 29 and 32 controlling the position of the gates nor projecting out into the normal walking path of an operator so that he might catch his clothes, bruise his arm, or the like. On the other hand, the chute is in a location and at a level where filling the trough with a measured amount of grain or feed is very convenient, as the stepped arrangement of the floor margin is such that the operator can step right up to the chute when he desires to do so. Moreover, its location is such that unnecessary walking is minimized, as the operator can turn to his left hand, fill the feed trough of a stall into which he has just admitted a cow, and on which a milker has been placed, then turn, without further walking, to the right to open the gates of the next stall, let out the cow that has just been milked, admit a new cow and place a machine in operation on the new cow.

While I have shown and described certain embodiments of my invention, it is to be understood that it is capable of many modifications. Changes, therefore, in the construction and arrangement may be made without departing from the spirit and scope of the invention as disclosed in the appended claims.

We claim:

1. A stall for a milking parlor, comprising: a pair of spaced vertical end members at one side of the stall structure each consisting of a single post; a central vertical supporting member consisting of a single post at the other side of the stall structure; bracing members extending between said end posts and between said central post and each of said end posts; and a pair of gates swingably mounted on said central post.

2. A stall for a milking parlor, comprising: a pair of spaced vertical end members at one side of the stall structure each consisting of a single post; a central vertical supporting member consisting of a single post at the other side of the stall structure, bracing members extending between said end posts and between said central post and each of said end posts at a height above the normal height of a cow; and a pair of gates swingably mounted on said central post.

3. A stall for a milking parlor, comprising: a pair of spaced vertical end members at one side of the stall structure each consisting of a single post; a central vertical supporting member consisting of a single post at the other side of the stall structure; bracing members extending between said end posts and between said central post and each of said end posts at a height above the normal height of a cow; and a pair of gates swingably mounted on said central post, at least one of said gates having a curved end portion extending to a point adjacent one of said end posts when the gate is closed.

4. A stall for a milking parlor, comprising: a pair of spaced vertical end members at one side of the stall structure; a central vertical supporting member at the other side of the stall structure; bracing members extending between said end members and between said central member and each of said end members; and a pair of gates swingably mounted on said central member and each adapted to extend to a point adjacent one of said end members when the gate is closed, at least one of said end members being narrow and the corresponding gate having a curved end portion, with said curved end portion forming the major part of the end of the stall that is defined by said narrow end member and the curved end portion.

5. A stall for a milking parlor, comprising: a pair of spaced vertical end members at one side of the stall structure; a central vertical supporting member at the other side of the stall structure; bracing members extending between said end members and between said central member and each of said end members; and a pair of gates swingably mounted on said central member and each adapted to extend to a point adjacent one of said end members when the gate is closed, at least one of said end members consisting of a single post and the corresponding gate having a curved end portion forming the major part of the end of the stall that is defined by said post and said curved end portion.

HENRY B. BABSON.
        CHESTER A. THOMAS.

REFERENCES CITED

The following references are of record in the file of this patent:

UNITED STATES PATENTS

| Number | Name | Date |
|---|---|---|
| 1,863,603 | Marshall, Jr. | June 21, 1932 |
| 2,269,012 | De Carli | Jan. 6, 1942 |
| 2,528,255 | Thomas | Oct. 31, 1950 |

FOREIGN PATENTS

| Number | Country | Date |
|---|---|---|
| 438,432 | Great Britain | Nov. 18, 1935 |